United States Patent
Kuo et al.

(10) Patent No.: US 7,885,201 B2
(45) Date of Patent: Feb. 8, 2011

(54) METHOD FOR FINDING OUT THE FRAME OF A MULTIMEDIA SEQUENCE

(75) Inventors: Pei-Yun Kuo, Hsinchu (TW); Yu-Cheng Hsieh, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 516 days.

(21) Appl. No.: 12/052,089

(22) Filed: Mar. 20, 2008

(65) Prior Publication Data

US 2009/0240357 A1 Sep. 24, 2009

(51) Int. Cl.
*H04J 1/16* (2006.01)
(52) U.S. Cl. .............................. 370/252; 700/94; 725/19
(58) Field of Classification Search ................. 370/252, 370/253; 375/240.01, 240.12; 700/94; 725/17–19
See application file for complete search history.

(56) References Cited

U.S. PATENT DOCUMENTS

| 5,323,396 | A | 6/1994 | Lokhoff |
| 5,777,992 | A | 7/1998 | Lokhoff |
| 2005/0100122 | A1 | 5/2005 | Hsu et al. |
| 2008/0039965 | A1* | 2/2008 | Hung et al. ................... 700/94 |

FOREIGN PATENT DOCUMENTS

| CN | 101072360 | 11/2007 |
| KR | 1020050077109 | 8/2005 |

OTHER PUBLICATIONS

English abstract of CN101072360.
English abstract of KR10-2005-0077109.

* cited by examiner

*Primary Examiner*—Ricky Ngo
*Assistant Examiner*—Kan Yuen
(74) *Attorney, Agent, or Firm*—Thomas, Kayden, Horstemeyer & Risley

(57) ABSTRACT

An electronic device is provided comprising a multimedia play unit and a processor. The processor receives a multimedia sequence, acquires a first bitrate of a first frame header from the received multimedia sequence, predicts a first length of a first frame comprising the first frame header by a formula employing at least parameters comprising the first bitrate and a proportion of a second length to a second bitrate of a second frame header prior to the first frame header, and directs the multimedia play unit to play frame data of the first frame according to the predicted first length of the first frame.

19 Claims, 5 Drawing Sheets

METHOD FOR FINDING OUT THE FRAME OF A MULTIMEDIA SEQUENCE

BACKGROUND OF THE INVENTION

1. Field of the Invention

The invention relates to a system and method for multimedia decoding, and more particularly to a system and method for finding out a start position of a frame header of a multimedia sequence.

2. Description of the Related Art

MPEG-1 defines a group of Audio and Video (AV) coding and compression standards agreed upon by MPEG (Moving Picture Experts Group). MPEG-1, Audio Layer 3 is the popular audio format known as MP3. As cheaper and more powerful consumer decoding hardware became available, more advanced formats such as MPEG-2 and MPEG-4 were developed. These newer formats are more complex and require more powerful hardware, but the formats also achieve greater coding efficiency.

Typically, an MP3 file is made up of multiple MP3 frames, which consist of the MP3 header and the MP3 data. This sequence of frames is called an elementary stream. Frames are independent items: one can cut the frames from a file and an MP3 player would be able to play it. The MP3 header contains the information of encoding scheme (e.g. encoding version, sampling rate, and bitrate), and the MP3 data is the actual audio payload. However, lengths of each frame may not be fixed because of the variety of encoding bitrates, or others, lengths of each frame of the MP3 file for subsequent decoding is required to be determined.

BRIEF SUMMARY OF THE INVENTION

An electronic device for multimedia decoding is provided. The electronic device comprises a multimedia play unit and a processor. The processor receives a multimedia sequence, acquires a first bitrate of a first frame header from the received multimedia sequence, predicts a first length of a first frame comprising the first frame header by a formula employing at least parameters comprising the first bitrate and a proportion of a second length to a second bitrate of a second frame header prior to the first frame header and directs the multimedia play unit to play frame data of the first frame according to the predicted first length of the first frame.

A method for finding out frame sizes of a multimedia sequence is provided. First, a first bitrate of a first frame header is acquired from the multimedia sequence. Next, a first length of a first frame comprising the first frame header is predicted by a formula. The formula employs at least parameters comprising the first bitrate and a proportion of a second length to a second bitrate. The second bitrate is of a second frame header prior to the first frame header. Next, a synchronous pattern is searched within a first search region comprising a position of a start position of the first frame header plus the predicted first length to identify a start position of a third frame header next to the first frame. Next, the first length is updated as a length between the start positions of the first frame header and the third frame header. Finally, frame data of the first frame is played.

A machine-readable storage medium storing a computer program performing a method for multimedia decoding is provided. First, a multimedia sequence is received. Next, a first bitrate of a first frame header is acquired from the multimedia sequence. Next, a first length of a first frame comprising the first frame header is predicted by a formula employing at least parameters comprising the first bitrate and a proportion of a second length to a second bitrate of a second frame header prior to the first frame header. Next, a start position of a third frame header next to the first frame is determined according the predicted first length. Next, the first length is updated as a length between start positions of the first frame header and the third frame header. Finally, frame data of the first frame is played.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
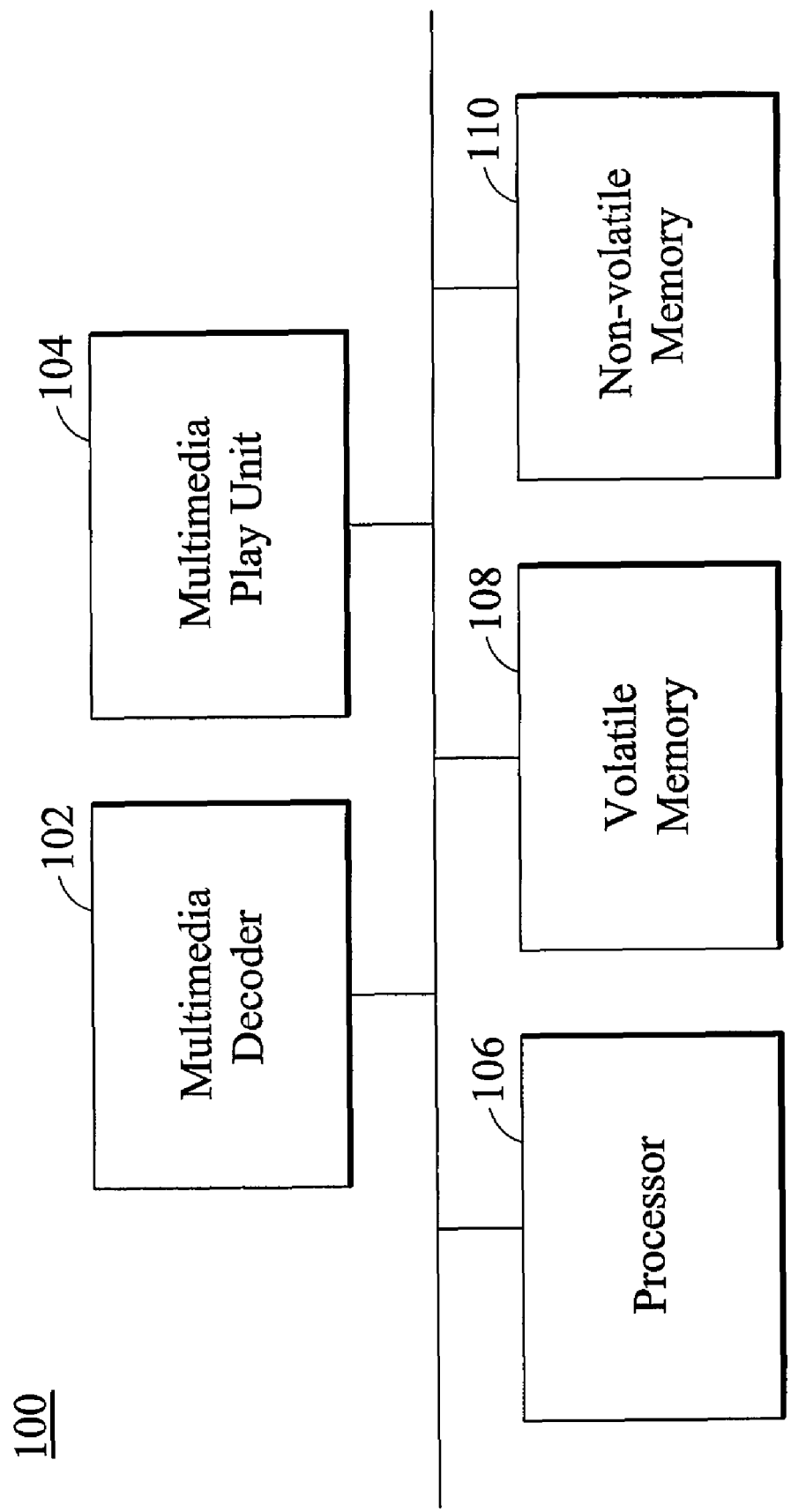
FIG. 1 shows an embodiment of a system for playing a multimedia file.

FIG. 1 shows an embodiment of a system for playing a multimedia file. The system 100 comprises a multimedia decoder 102, a multimedia play unit 104, a processor 106, a volatile memory 108, and a non-volatile memory 110. Non-volatile memory 110 (e.g. hard disk or flash memory) can store a multimedia file such as an audio file or a video file, or combinations of the like. A multimedia file usually comprises multiple frames in sequence, and each frame is usually composed of two parts, the leading part is frame header and the later part is frame data. Each frame header has a common pattern with specific organization, and the common pattern is typically composed of a synchronous pattern and multimedia profile information (e.g file type, bitrate, encoding scheme, or others). Each frame data may store a segment of encoded multimedia data and can be decoded according to each corresponding frame header. In a multimedia file, the length (or size) of each frame header is fixed, however, the length of each frame may not be fixed because the bitrate of frame data may vary with the encoding scheme. Accordingly, processor 106 can execute a computer program performing a method for finding the frame headers of the multimedia file to identify start positions of the frames. The multimedia decoder 102 may decode the frame data according the multimedia profile information stored in the corresponding frame header. Subsequently, the processor 106 may direct the multimedia play unit 104, such as a display unit or a speaker, to play the decoded frame data. Volatile memory 108 may store the computer program and be accessed by processor 106, such as a dynamic random access memory (DRAM), static random access memory (SRAM), or others.

Figure 2:
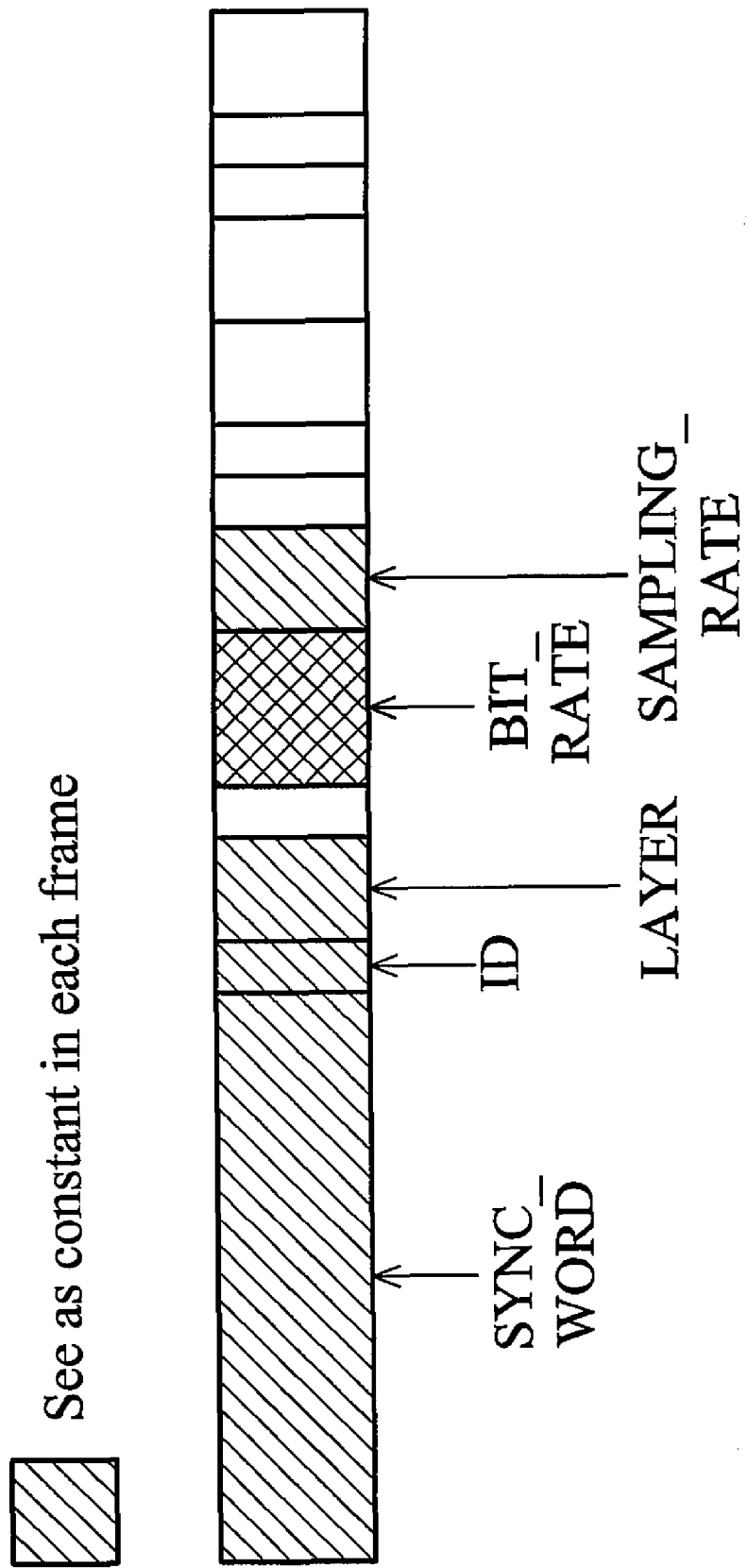
FIG. 2 shows an example of an audio header format, MPEG1, 11172-3.

FIG. 2 shows an example of an audio header format, MPEG1, 11172-3, typically called MP3. The audio header format comprises multiple fields. In a multimedia file, each frame header has the same header length. A field SYNC_WORD can be used as a synchronous pattern (e.g. 0xFFF or 0xFFE) to verify the beginning of a valid frame. A field ID represents the MPEG audio version ID, and a field LAYER represents the encoding layer. A field SAMPLING_RATE represents the sampling rate of an MP3 file, such as 16 kHz or 24 kHz. In an MP3 file, fields SYNC_WORD, ID, LAYER, and SAMPLING_RATE are seen as constant in each frame header of the whole MP3 file. A field BITRATE represents the bitrate of the corresponding frame data, and there are several predetermined bitrates which can be chosen when a multimedia encoder encodes a MP3 file. It is noted that other multimedia frame headers, such as MPEG-2 or MPEG-4, may contain different header formats with different synchronous patterns.

Table 1 shows an example of bitrate table of MPEG1, 11172-3, where Fs denotes sampling rate and the length of field BITRATE is four bits.

TABLE 1

| BITRATE | Bitrate specified (kbit/s) for Fs = 16, 22, 05, 24 kHz | |
|---|---|---|
| | Layer I | Layer II, Layer III |
| '0000' | free | Free |
| '0001' | 32 | 8 |
| '0010' | 48 | 16 |
| '0011' | 56 | 24 |
| '0100' | 64 | 32 |
| '0101' | 80 | 40 |
| '0110' | 96 | 48 |
| '0111' | 112 | 56 |
| '1000' | 128 | 64 |
| '1001' | 144 | 80 |
| '1010' | 160 | 96 |
| '1011' | 176 | 112 |
| '1100' | 192 | 128 |
| '1101' | 224 | 144 |
| '1110' | 256 | 160 |
| '1111' | forbidden | forbidden |

Figure 3A:
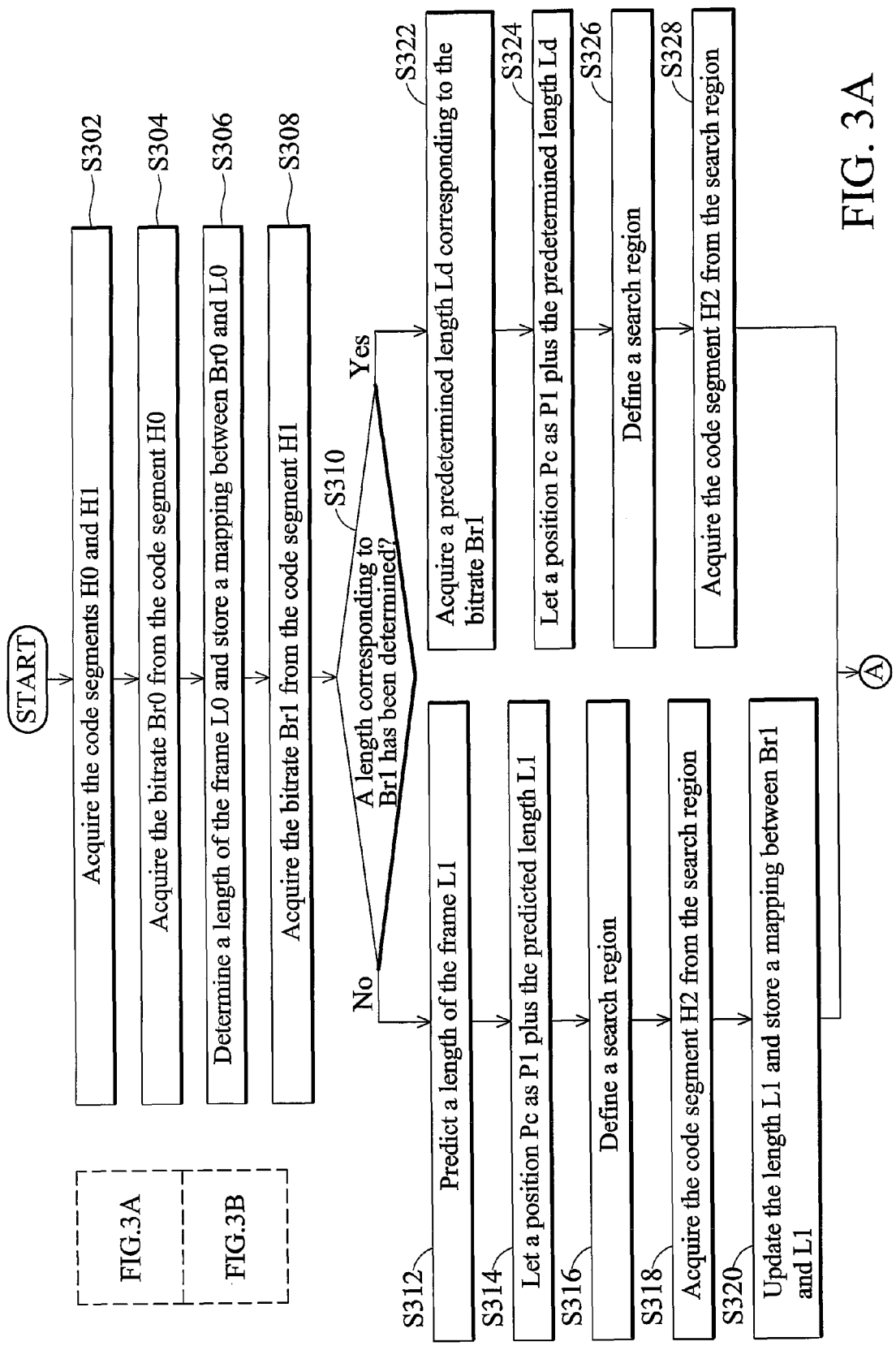
FIG. 3(A) is a flowchart of a method for finding out frame sizes of a multimedia sequence.
Figure 4A:
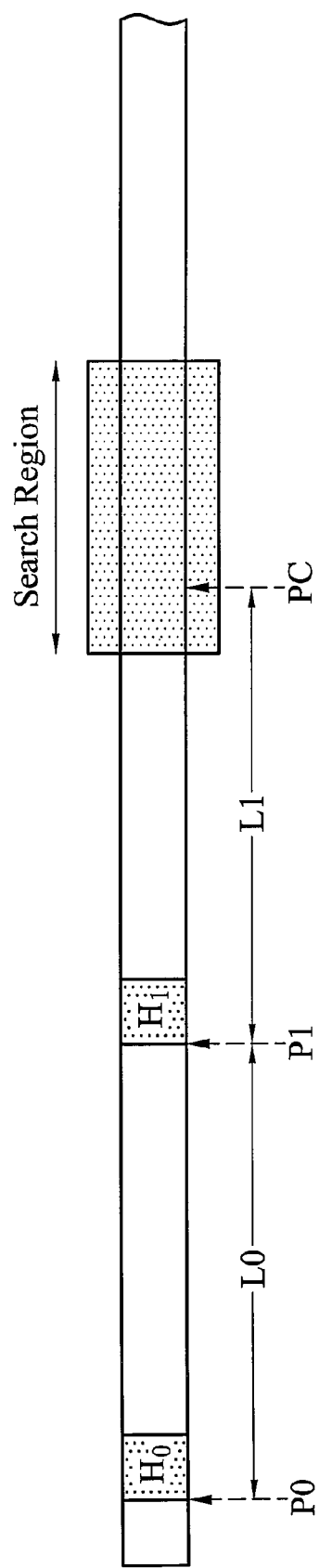
FIGS. 4(A)-4(B) show a segment of a multimedia sequence corresponding to the method of FIG. 3(A).
Figure 4B:
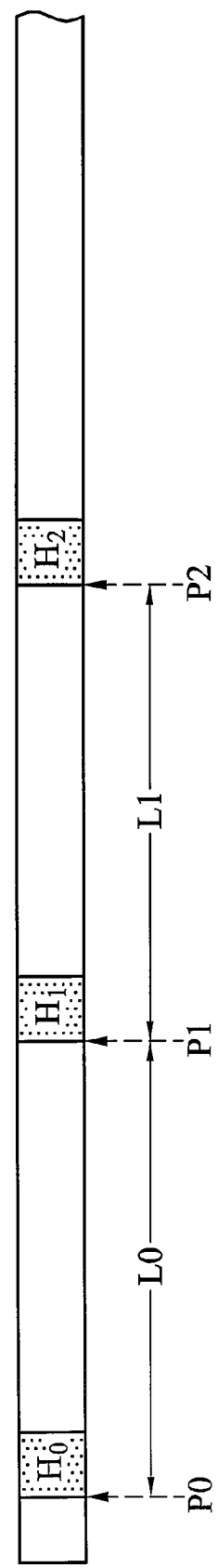

FIG. 3(A) is a flowchart of a method for finding out frame sizes of a multimedia sequence, and the method can be stored in a computer program and executed by the processor described in FIG. 1. FIGS. 4(A)-4(B) show a segment of a multimedia sequence corresponding to the method of FIG. 3(A). Referring to FIG. 3(A) and FIG. 4(A), the code segments, H0 and H1, are acquired from the multimedia sequence (step S302), and a potential bitrate Br0 is acquired from the code segment H0 (step S304). Both of the code segments H0 and H1 comprise the same patterns (i.e. common patterns) with a specific organization. A length of the frame L0 between start positions of the code segments, P0 and P1, is determined, and a mapping between Br0 and L0 is stored in a lookup table (step S306). The lookup table may be stored in the volatile memory described in FIG. 1, and the processor described in FIG. 1 may consult the lookup table and read out the corresponding length from the volatile memory. Table 2 shows an example of the lookup table assuming that the multimedia file is a file of MPEG1, 11172-3, Layer II or Layer III. For example, if the potential bitrate Br0 is 40kbit/s, the length L0 can be stored as Len(Br$_{40}$) in the lookup table. Therefore, a potential bitrate Br1 is acquired from the code segment H1 (step S308), and checked whether a length corresponding to the acquired bitrate Br1 has been determined in the lookup table (step S310).

TABLE 2

| BITRATE | Bitrate specified (kbit/s) for Fs = 16, 22, 05, 24 kHz | |
|---|---|---|
| | Layer II, Layer III | Frame length |
| '0000' | free | — |
| '0001' | 8 | N/A |
| '0010' | 16 | N/A |
| '0011' | 24 | N/A |
| '0100' | 32 | N/A |
| '0101' | 40 | Len(Br$_{40}$) |
| '0110' | 48 | N/A |
| '0111' | 56 | N/A |
| '1000' | 64 | N/A |
| '1001' | 80 | N/A |
| '1010' | 96 | N/A |
| '1011' | 112 | N/A |
| '1100' | 128 | N/A |
| '1101' | 144 | N/A |
| '1110' | 160 | N/A |
| '1111' | forbidden | — |

When the length corresponding to the acquired bitrate Br1 is not determined (e.g bitrate Br1 is 96kbit/s and no frame length stored in Table 2 corresponds to bitrate Br1), a length of the frame L1 is predicted by using a formula employing at least parameters of a proportion of the length L0 to the bitrate Br0 and Br1 (step S312). For example, the length L1 is predicted as Br1×(L0/Br0). A position Pc is set as P1 plus the predicted length L1 (step S314). A search region is defined between Pc minus a tolerance length Lb1 and Pc plus the tolerance length Lb1 plus a predetermined header length (step S316). The tolerance length Lb1 could be the smallest integer larger than Br$_{max}$/Br$_{min}$, where Br$_{max}$ and Br$_{min}$ are respectively the possible maximum and minimum bitrates of a frame. Referring to FIG. 4(B), a code segment H2, with a start position P2, comprising the common pattern with the specific organization is acquired from the search region (step S318). Accordingly, the length L1 is updated with an actual length between the start positions P1 and P2, and a mapping between Br1 and L1 is stored in the lookup table (step S320).

When the length corresponding to the acquired bitrate Br1 is determined (e.g. bitrate Br1 is 40kbit/s and the corresponding frame length Len(Br$_{40}$) has been found in Table 2), a predetermined (i.e. stored) length Ld corresponding to the bitrate Br1 is acquired from the lookup table (step S322), and a position Pc is set as P1 plus the predetermined length Ld (step S324). A search region between Pc minus a tolerance length Lb2 (e.g. 1 byte) and Pc plus the tolerance length Lb2 plus the predetermined header length is defined (step S326). The code segment H2, with a start position P2, comprising the common pattern with the specific organization is acquired from the search region (step S328).

Else, when the start position P2 can be discovered from the search region, the length L0 can be deemed reliable and the proportion of L0 to Br0 can also be deemed reliable. Moreover, the discovered same patterns with the specific organization of code segments H0 and H1 can be deemed reliable. When the start position P2 cannot be discovered in the search region, however, another common pattern is needed to be found out to acquire a new length L0, and the new L0 is needed to be validated again. For solving such exceptional result, steps S302 to S328 may be re-executed after the previously acquired code segment H0 of the multimedia sequence.

Figure 3B:
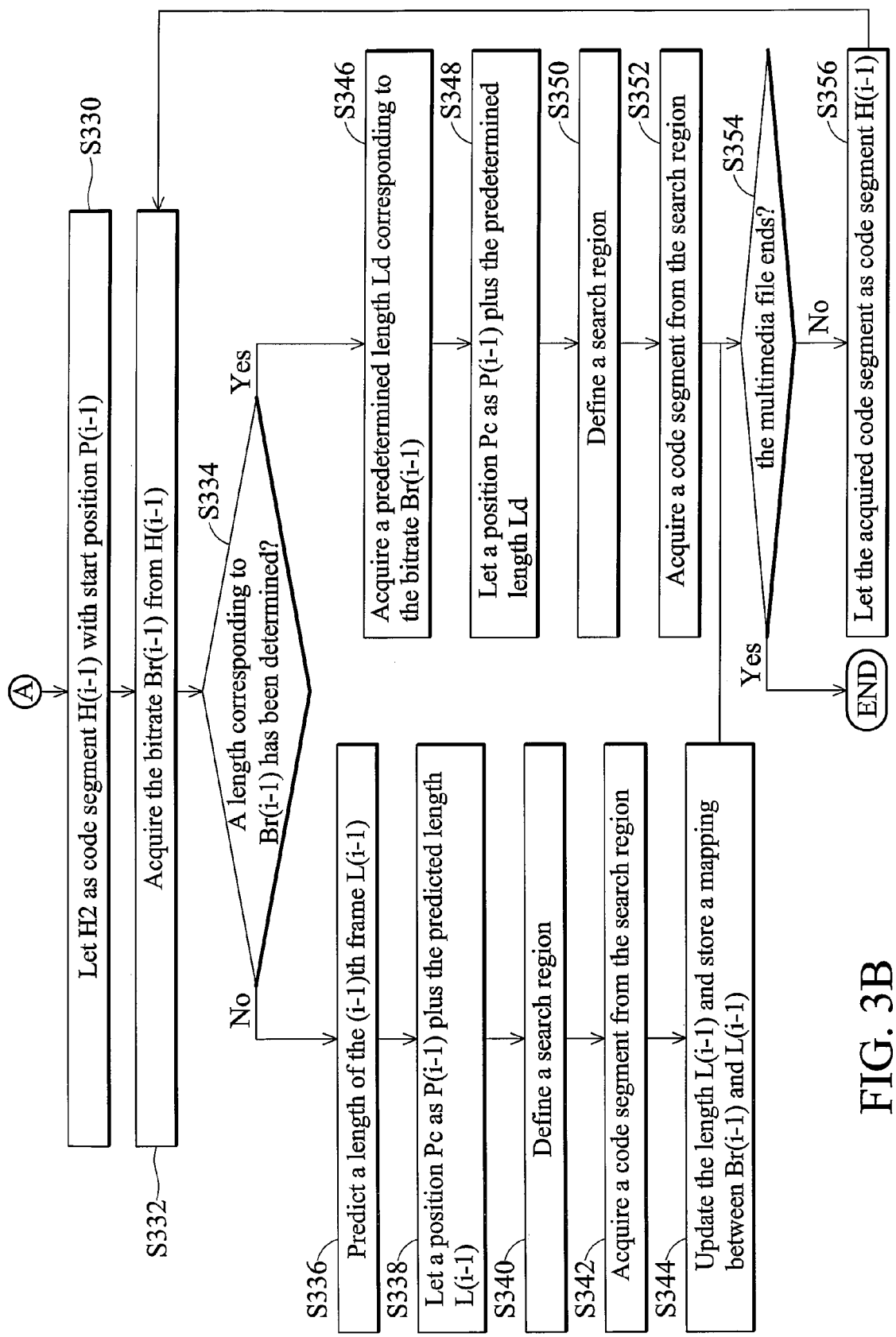
FIG. 3(B) is a continuous flowchart of FIG. 3(A)

FIG. 3(B) is a continuous flowchart of FIG. 3(A). The code segment H2 is set as a frame header H(i−1) with a start position P(i−1) (step S330). The bitrate Br(i−1) is acquired from the frame header H(i−1) (step S332), and then checked whether a length corresponding to the acquired bitrate Br(i−1) has been determined (step S334). When the length corresponding to the acquired bitrate Br(i−1) is not determined, a length of the (i−1)th frame L(i−1) is predicted by using a formula employing at least parameters of Br(i−1) and a proportion of the length L0 to the bitrate Br0 (step S336), and a position Pc is set as P(i−1) plus the predicted length L(i−1) (step S338). A search region is defined between Pc minus a tolerance length Lb1 and Pc plus the tolerance length Lb1 plus the predetermined header length (step S340). The tolerance length Lb1, for example, could be the smallest integer larger than $Br_{max}/Br_{min}$, where $Br_{max}$ and $Br_{min}$ are respectively the possible maximum and minimum bitrate of a frame. A frame header, with a start position P(i), comprising the common pattern with the specific organization is acquired from the search region (step S342). Accordingly, the length L(i−1) is updated with an actual length between the start positions P(i−1) and P(i), and a mapping between Br(i−1) and L(i−1) is stored in the lookup table (step S344).

Else, when the length corresponding to the acquired bitrate Br(i−1) is determined, a predetermined length Ld corresponding to the bitrate Br(i−1) is acquired from the lookup table (step S346), and a position Pc is set as P(i−1) plus the predetermined length Ld (step S348). A search region between Pc minus a tolerance length Lb2 (e.g. 1 byte) and Pc plus the tolerance length Lb2 plus the predetermined header length is defined (step S350). It is to be understood that the tolerance length Lb2 present in step S350 may be smaller than the tolerance length Lb1 present in step S450. A frame header, with a start position P(i), comprising the common pattern with the specific organization is acquired from the search region (step S352). After the frame header comprising P(i) has been found, it is determined whether the multimedia file ends (step S354). If so, the whole process also ends; if not, the acquired frame header is set as frame header H(i−1) (step S356) and then back to step S332 to discover subsequent multimedia frames.

An advantage of the embodiment is that the frame size can be determined only by one variable, i.e. frame bitrate, from a multimedia sequence which has synchronous pattern (or common pattern) and bitrate information in each frame header. Another advantage of the embodiment is that, because types of bitrate are limited, a record of a frame length corresponding to a bitrate type in a lookup table can be generated and stored upon acquisition of the mapping via the formula, and validation of the mapping by inspection of the next frame header. Therefore, the search time during decoding can be reduced.

While the invention has been described by way of examples and in terms of preferred embodiments, it is to be understood that the invention is not limited thereto. Any variation or modification can be made by those skilled in art without departing from the spirit or scope of the invention. Therefore, the scope of the appended claims should be accorded the broadest interpretation to encompass all such modifications and similar arrangements.

What is claimed is:

1. An electronic device, comprising:
  a multimedia play unit; and
  a processor, receiving a multimedia sequence,
    acquiring a first bit-rate of a first frame header from the received multimedia sequence,
    predicting a first length of a first frame comprising the first frame header by a formula employing at least parameters comprising the first bit-rate and a proportion of a second length to a second bit-rate of a second frame header prior to the first frame header;
    searching a synchronous pattern within a first search region comprising a position of a start position of the first frame header plus the predicted first length to identify a start position of a third frame header next to the first frame, updating the first length as a length between the start positions of the first frame header and the third frame header, and
  directing the multimedia play unit to play frame data of the first frame according to the predicted first length of the first frame.

2. The electronic device as claimed in claim 1, wherein the start position of the third frame header is located in a first search region.

3. The electronic device as claimed in claim 2, wherein the processor further acquires the second bit-rate from the second frame header and determines the second length by measuring a length between the second frame header and the first frame header, and each of the first, the second, and the third frame header comprises the same common pattern with the same specific organization.

4. The electronic device as claimed in claim 3, wherein the multimedia sequence is a MPEG-1, 11172-3 (.mp3) file, and the common pattern complies with an MP3 header format.

5. The electronic device as claimed in claim 2, wherein the processor further acquires a third bit-rate of the third frame header, determines a third length of a third frame comprising the third frame header as the updated first length when the third bit-rate equals the first bit-rate, updates the third length with a length between the start position of the third frame header and a start position of a fourth frame header next to the third frame, and directs the multimedia play unit to play frame data of the third frame, and wherein the start position of the fourth frame header is located in a second search region comprising a position of the start position of the third frame header plus the predetermined third length.

6. The electronic device as claimed in claim 5, wherein the second search region is smaller than the first search region.

7. The electronic device as claimed in claim 5, further comprising a data storage device configured to store a lookup table comprising a mapping between the updated first length and the first bit-rate, wherein the processor further consults the lookup table to determine whether the third bit-rate matches the first bit-rate and reads out the updated first length if the third bit-rate equals the first bit-rate.

8. A method for finding out frame sizes of a multimedia sequence, comprising:
  acquiring a first bit-rate of a first frame header from the multimedia sequence;
  predicting a first length of a first frame comprising the first frame header by a formula employing at least parameters comprising the first bit-rate and a proportion of a second length to a second bit-rate of a second frame header prior to the first frame header;
  searching a synchronous pattern within a first search region comprising a position of a start position of the first frame header plus the predicted first length to identify a start position of a third frame header next to the first frame;
  updating the first length as a length between the start positions of the first frame header and the third frame header; and
  playing frame data of the first frame.

9. The method as claimed in claim 8, wherein predicting the first length further comprises:
  acquiring the second bit-rate from the second frame header; and determining the second length by measuring a length between a start position of the second frame header and the start position of the first frame header.

10. The method as claimed in claim 8, further comprising: acquiring a third bit-rate of the third frame header; determining a third length of a third frame comprising the third frame header as the updated first length when the third bit-rate equals the first bit-rate; searching the synchronous pattern within a second search region comprising a position of the start position of the third frame header plus the predetermined third length to identify a start position of a fourth frame header next to the third frame; determining the third length as a length between the start positions of the third frame header and the fourth frame header; and playing frame data of the third frame.

11. The method as claimed in claim 10, wherein predetermining the third length further comprises:
storing a mapping between the updated first length and the first bit-rate in a lookup table; consulting the lookup table to determine whether the third bit-rate equals the first bit-rate; and setting the third length as the updated first length if the third bit-rate equals the first bit-rate.

12. The method as claimed in claim 10, wherein the second search region is smaller than the first search region.

13. The method as claimed in claim 10, wherein the first search region is defined between a first predictive position minus a first tolerance length and the first predictive position plus the first tolerance length plus a predetermined header length, the second search is defined between a second predictive position minus a second tolerance length and the second predictive position plus the second tolerance length plus the predetermined header length, the first predictive position corresponds to the predicted first length of the first frame, and the second predictive position corresponds to the determined third length of the third frame.

14. The method as claimed in claim 13, wherein the first tolerance length is the smallest integer larger than the possible maximum bit-rate over the possible minimum bit-rate, and the second tolerance length is one byte.

15. The method as claimed in claim 8, wherein the first length of the first frame is predicted by a formula, $Br1 \times (L0/Br0)$, $Br1$ represents the first bit-rate, $L0$ represents the second length and $Br0$ represents the second bitrate.

16. The method as claimed in claim 8, wherein the multimedia sequence is a MPEG-1 Audio Layer 3 (.mp3) file, and the synchronous pattern is a sync word of an MP3 header format.

17. The method as claimed in claim 8, wherein the synchronous pattern is "0xFFF" or "0xFFE".

18. A non-transitory machine-readable storage medium storing a computer program, the computer program performing a method comprising the steps of:
receiving a multimedia sequence;
acquiring a first bit-rate of a first frame header from the multimedia sequence;
predicting a first length of a first frame comprising the first frame header by a formula employing at least parameters comprising the first bit-rate and a proportion of a second length to a second bit-rate of a second frame header prior to the first frame header;
determining a start position of a third frame header next to the first frame according the predicted first length by searching a synchronous pattern within a first search region comprising a position of a start position of the first frame header plus the predicted first length;
updating the first length as a length between start positions of the first frame header and the third frame header; and
playing frame data of the first frame.

19. The machine-readable storage medium as claimed in claim 18, wherein the method further comprises: acquiring the second bit-rate from the second frame header; and determining the second length by measuring a length between a start position of the second frame header and the start position of the first frame header.

* * * * *

UNITED STATES PATENT AND TRADEMARK OFFICE
CERTIFICATE OF CORRECTION

| | | |
|---|---|---|
| PATENT NO. | : 7,885,201 B2 | Page 1 of 1 |
| APPLICATION NO. | : 12/052089 | |
| DATED | : February 8, 2011 | |
| INVENTOR(S) | : Kuo et al. | |

It is certified that error appears in the above-identified patent and that said Letters Patent is hereby corrected as shown below:

On the title page, item (54) and col. 1, line 1,

The title should read: "Method for Finding Out the Frame Size of a Multimedia Sequence"

Signed and Sealed this
Twenty-ninth Day of March, 2011

David J. Kappos
*Director of the United States Patent and Trademark Office*